(12) United States Patent
Sytsma et al.

(10) Patent No.: US 9,902,430 B2
(45) Date of Patent: Feb. 27, 2018

(54) BAFFLE ASSEMBLY AND A VEHICLE

(71) Applicant: GM GLOBAL TECHNOLOGY OPERATIONS LLC, Detroit, MI (US)

(72) Inventors: Scott A. Sytsma, Macomb, MI (US); Ana Isabel Payro Romero, Metepec (MX); Fulgencio Sergio Mendez Morales, Morelos (MX)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 15/041,676

(22) Filed: Feb. 11, 2016

(65) Prior Publication Data

US 2017/0233010 A1    Aug. 17, 2017

(51) Int. Cl.
*B62D 25/08* (2006.01)
*B60R 19/48* (2006.01)
*B60K 11/08* (2006.01)

(52) U.S. Cl.
CPC .............. *B62D 25/08* (2013.01); *B60K 11/08* (2013.01); *B60R 19/48* (2013.01); *B60R 2019/486* (2013.01)

(58) Field of Classification Search
CPC ......... B62D 25/08; B60K 11/08; B60R 19/48; B60R 2019/486
See application file for complete search history.

(56) References Cited

U.S. PATENT DOCUMENTS

2013/0192801 A1*  8/2013  Leonard .................. F28F 21/06
                                              165/109.1

* cited by examiner

*Primary Examiner* — D Glenn Dayoan
*Assistant Examiner* — Melissa A Black
(74) *Attorney, Agent, or Firm* — Quinn IP Law

(57) ABSTRACT

A baffle assembly includes a body, and a vehicle includes a bumper beam and the baffle assembly. The body includes an edge facing outwardly away from the body. A region of the edge includes a plurality of supports spaced from each other. The baffle assembly further includes a seal member secured to the edge of the body. The seal member includes a plurality of protrusions spaced from each other and interleaved with the plurality of supports such that the protrusions and the supports cooperate with each other in an alternating pattern which creates an area configured to absorb energy when a force is applied in the region.

20 Claims, 3 Drawing Sheets

BAFFLE ASSEMBLY AND A VEHICLE

TECHNICAL FIELD

The present disclosure relates to a baffle assembly and a vehicle.

BACKGROUND

Vehicles can include a shutter that allows air to flow into an engine compartment area. A baffle can be disposed around the shutter to assist in guiding the air toward the shutter.

SUMMARY

The present disclosure provides a baffle assembly including a body. The body includes an edge facing outwardly away from the body. A region of the edge includes a plurality of supports spaced from each other. The baffle assembly further includes a seal member secured to the edge of the body. The seal member includes a plurality of protrusions spaced from each other and interleaved with the plurality of supports such that the protrusions and the supports cooperate with each other in an alternating pattern which creates an area configured to absorb energy when a force is applied in the region.

The present disclosure also provides a vehicle including a bumper beam and a baffle assembly. The baffle assembly is disposed above the bumper beam. The baffle assembly includes a body that includes an edge facing outwardly away from the body. A region of the edge includes a plurality of supports spaced from each other. The baffle assembly also includes a seal member secured to the edge of the body. The seal member includes a plurality of protrusions spaced from each other and interleaved with the plurality of supports such that the protrusions and the supports cooperate with each other in an alternating pattern which creates an area configured to absorb energy when a force is applied in the region.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
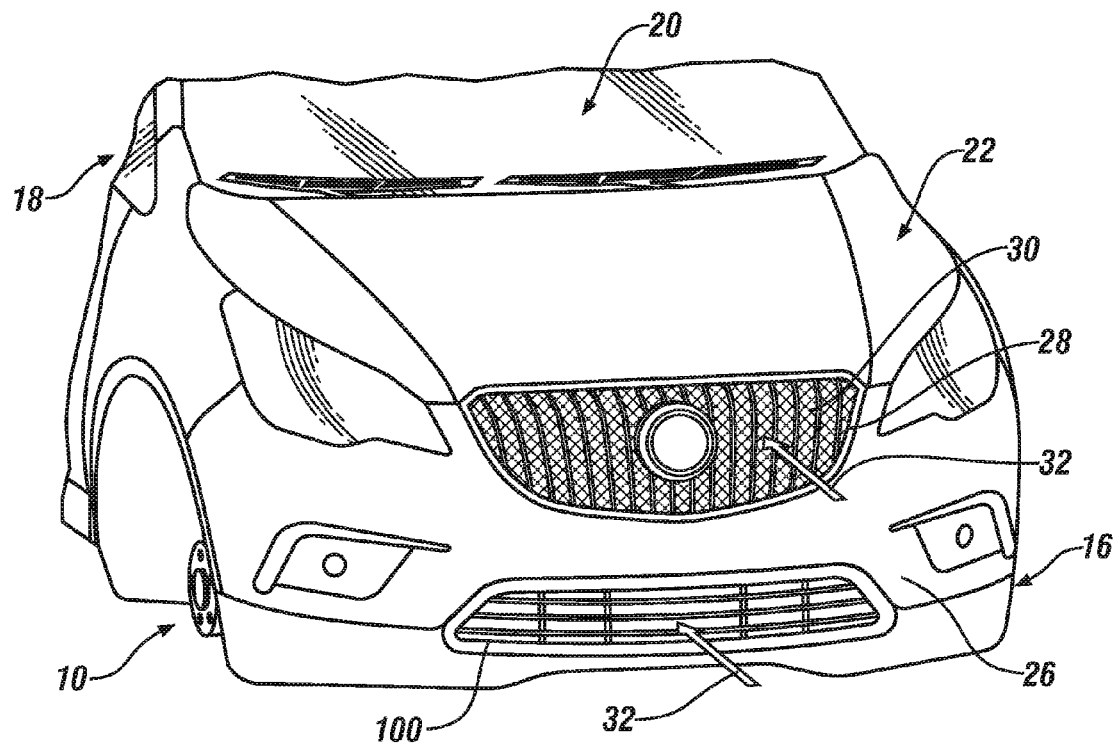
FIG. 1 is a schematic fragmentary perspective view of a vehicle.
Figure 2:
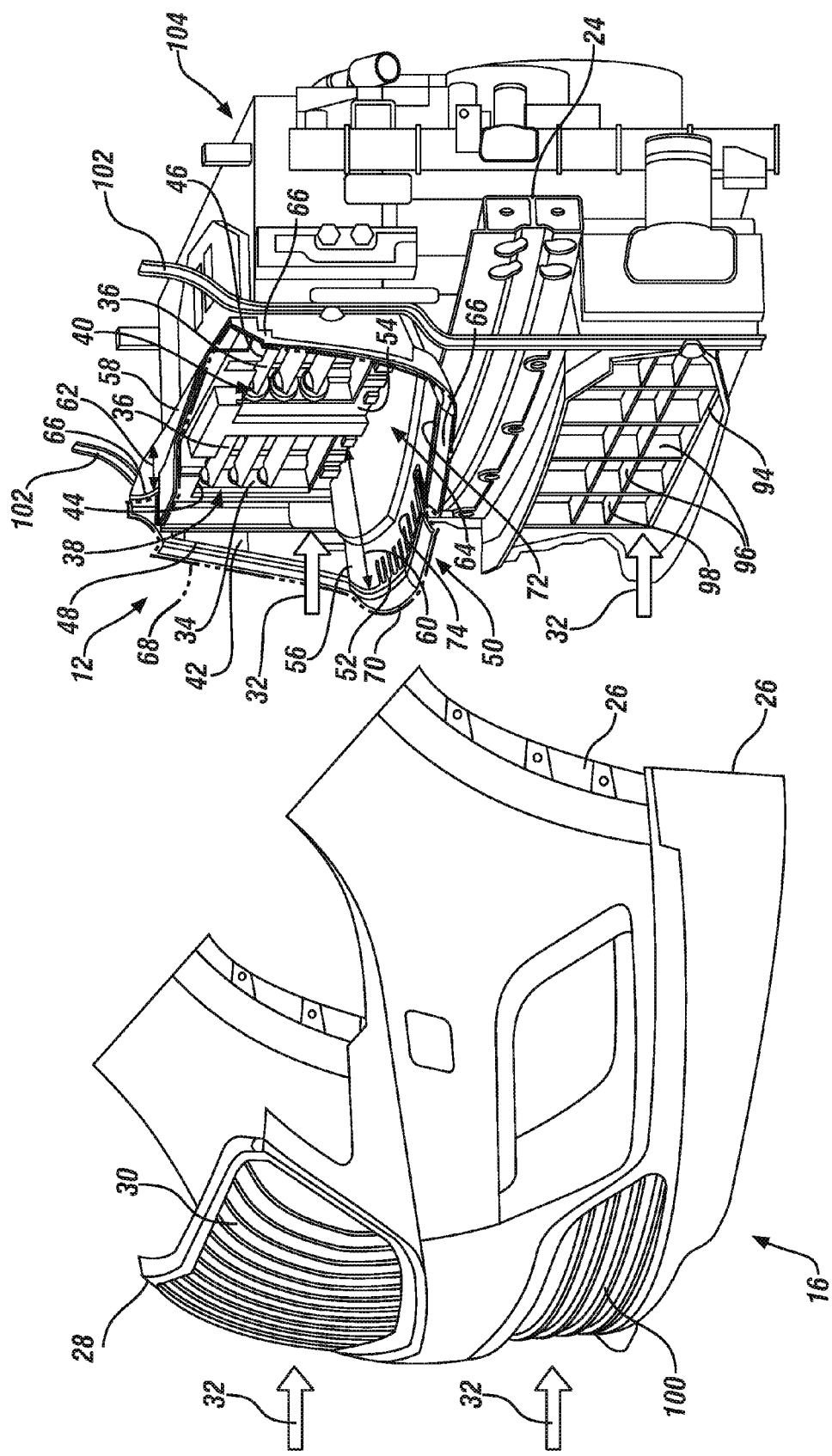
FIG. 2 is a schematic perspective partial exploded view of a grill and a fascia spaced from a baffle assembly and components to operate the vehicle.

Referring to the Figures, wherein like numerals indicate like or corresponding parts throughout the several views, a vehicle 10 is generally shown in FIG. 1 and a baffle assembly 12 is generally shown in FIG. 2. As discussed in detail below, the baffle assembly 12 includes a feature that allows energy to be absorbed when a force 14 (see FIG. 5) is applied. Therefore, for example, the baffle assembly 12 can be incorporated into the vehicle 10, and thus, when the force 14 is applied in a particular region, the baffle assembly 12 can absorb energy due to the force 14.

The baffle assembly 12 can be utilized in a vehicle application or a non-vehicle application. Non-limiting examples of the vehicle 10 can include a movable platform, a truck, a commercial vehicle, an industrial vehicle, a passenger vehicle, an aircraft, a watercraft, a locomotive, farm equipment, a construction vehicle, a warehouse vehicle, etc. Non-vehicle applications can include farm equipment, manufacturing facilities, warehouses, etc.

Referring to FIG. 1, generally, the vehicle 10 can include a front end 16 and a rear end 18 opposing the front end 16. The vehicle 10 can also include a passenger compartment 20 disposed between the front and rear ends 16, 18, in which one or more passengers can enter and exit the vehicle 10. In certain embodiments, an engine compartment 22 can be disposed between the front end 16 and the passenger compartment 20. In other words, the engine compartment 22 can be disposed in front of the passenger compartment 20. The engine compartment 22 can house engine components, and other components to operate the vehicle 10.

As best shown in FIG. 2, the vehicle 10 can include a bumper beam 24. In certain embodiments, the bumper beam 24 can be located proximal to the front end 16 of the vehicle 10. The bumper beam 24 can be formed of any suitable configuration and any suitable material, and non-limiting examples of the material can include steel and/or aluminum. The bumper beam 24 can include one or more pieces.

Continuing with FIG. 2, the vehicle 10 can also include a fascia 26 covering the bumper beam 24 to provide an aesthetically pleasing outer appearance to the vehicle 10. In certain embodiments, the fascia 26 covers a portion of the front end 16 of the vehicle 10. In other embodiments, the fascia 26 can cover the rear end 18 of the vehicle 10. The fascia 26 can be any suitable configuration, and can include one or more pieces.

Continuing with FIG. 2, the vehicle 10 can also include a grill 28 disposed along the front end 16 of the vehicle 10. The grill 28 can be coupled to the fascia 26. Generally, the grill 28 can define a plurality of openings 30 to allow a flow of gaseous fluid 32 through the grill 28 toward the engine compartment 22. In certain embodiment, the gaseous fluid 32 can be air.

Again, continuing with FIG. 2, the vehicle 10 and/or the baffle assembly 12 can also include a shutter 34 disposed above the bumper beam 24. The shutter 34 can general align with the grill 28 such that gaseous fluid 32, through the grill 28, can enter the shutter 34. As such, the shutter 34 can be disposed behind the grill 28. Optionally, the shutter 34 can be movable to change an amount of the gaseous fluid 32 that enters the engine compartment 22. This type of movable shutter 34 can be referred to as an active shutter.

As shown in FIG. 2, the shutter 34 can include a plurality of slats 36 arranged in a row. In certain embodiments, each of the slats 36 is rotatable to increase or reduce the amount of the gaseous fluid 32 that enters the engine compartment 22. In certain embodiments, there can be more than one grouping of slats 36 arranged in a row. Therefore, for example, there can be a first group 38 of slats 36 arranged in a row, and a second group 40 of slats 36 arranged in a row and spaced from the first group 38. The first and second groups 38, 40 can be spaced from each other in any suitable location; and non-limiting examples can include side-by-side to each other, above and below each other, offset from each other, front and back of each other, etc.

Furthermore, as best shown in FIG. 2, the vehicle 10 can include the baffle assembly 12. In certain embodiments, the baffle assembly 12 is disposed above the bumper beam 24. The fascia 26 and the grill 28 can cover the baffle assembly 12 to provide an aesthetically pleasing outer appearance to the vehicle 10. As discussed in detail below, the baffle assembly 12 at least partially surrounds the shutter 34 to assist in guiding the gaseous fluid 32 toward the shutter 34.

Continuing with FIG. 2, the baffle assembly 12 also includes a body 42. The body 42 can define an aperture 44. The aperture 44 allows gaseous fluid 32 to flow through the body 42 toward the passenger compartment 20. The shutter 34 can be at least partially disposed in the aperture 44 such that the body 42 surrounds at least part of the shutter 34. Specifically, the first group 38 of slats 36 can be surrounded by the aperture 44. In certain embodiments, a portion of the shutter 34 can be disposed in front of and/or behind the aperture 44. Each of the slats 36 is rotatable relative to the body 42 to increase or reduce the amount of the gaseous fluid 32 that enters the aperture 44. Therefore, adjusting the position of the slats 36 changes the amount of the gaseous fluid 32 that enters the aperture 44.

The aperture 44 can be further defined as a first aperture 44, and in certain embodiments, the body 42 can define the first aperture 44 and a second aperture 46 spaced from each other. When the body 42 defines the first and second apertures 44, 46, the first group 38 of slats 36 can be surrounded by the first aperture 44 and the second group 40 of slats 36 can be surrounded by the second aperture 46. The first and second apertures 44, 46 can be spaced from each other in any suitable location; and non-limiting examples can include side-by-side to each other, above and below each other, offset from each other, front and back of each other, etc.

Figure 3:
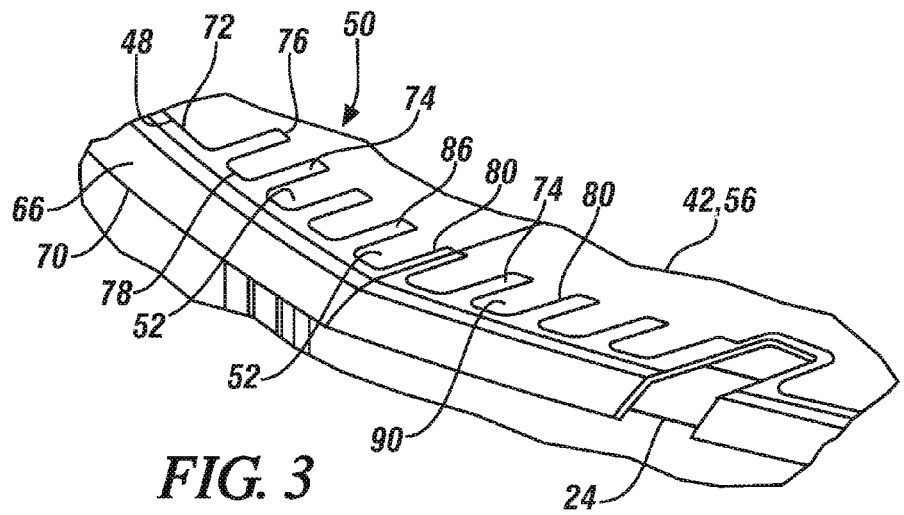
FIG. 3 is a schematic fragmentary enlarged perspective view of a region, with a plurality of supports and a plurality of protrusions disposed in an alternating pattern along the region.

Referring to FIGS. 2 and 3, the body 42 includes an edge 48 facing outwardly away from the body 42. A region 50 of the edge 48 includes a plurality of supports 52 spaced from each other. Generally, the region 50 of the edge 48 is disposed below the shutter 34. More specifically, the region 50 of the edge 48 can be disposed between the shutter 34 and the bumper beam 24.

Continuing with the configuration of the body 42, the body 42 can include a wall 54, and in certain embodiments, the wall 54 defines the aperture 44. Therefore, in certain embodiments, the wall 54 at least partially surrounds the shutter 34. The body 42 can also include a lip 56 extending outwardly away from the wall 54 below the shutter 34. In certain embodiments, the lip 56 can extend outwardly away from the wall 54 between the shutter 34 and the bumper beam 24. The lip 56 can include the region 50 of the edge 48 and the supports 52. In certain embodiments, the lip 56 can be further defined as a first lip 56.

As discussed above, the body 42 can include the first lip 56, which includes the region 50 of the edge 48. Furthermore, the body 42 can also include a second lip 58 extending outwardly away from the wall 54 in the same direction as the first lip 56 such that the lips 56, 58 at least partially overlap each other. The second lip 58 can also include the edge 48 of the body 42, but not the region 50 of the edge 48. Additionally, the first lip 56 can extend a first distance 60 away from the wall 54 and the second lip 58 can extend a second distance 62 away from the wall 54. In certain embodiments, the first distance 60 is greater than the second distance 62.

Continuing with FIG. 2, the first and second lips 56, 58 are spaced from each other to define a pocket 64 therebetween. In certain embodiments, the first lip 56 can be disposed below the shutter 34 and the second lip 58 can be disposed above the shutter 34. Simply stated, the shutter 34 can be disposed between the first and second lips 56, 58. As such, the shutter 34 can align with the pocket 64, and the first and second lips 56, 58 can be spaced from the aperture 44.

Turning to FIGS. 2 and 3, the baffle assembly 12 also includes a seal member 66 secured to the edge 48 of the body 42. In certain embodiments, the seal member 66 completely surrounds the edge 48 of the body 42. Therefore, the seal member 66 can be secured to the first and second lips 56, 58. Generally, the seal member 66 assists in guiding the gaseous fluid 32 from the grill 28 toward the shutter 34. The seal member 66 can engage an inside of the fascia 26 and an inside of the grill 28 to minimize the flow of the gaseous fluid 32 outside of the edge 48 of the body 42 and away from the shutter 34. A phantom line (labeled 68) has been added in FIG. 2 for illustrative purposes to identify the general location where the inside of the fascia 26 and the inside of the grill 28 can engage each other.

Again continuing with FIGS. 2 and 3, the seal member 66 can include an outer edge 70 spaced from the edge 48 of the body 42 and an inner edge 72 secured to the edge 48 of the body 42. Therefore, the outer edge 70 can engage the inside of the fascia 26 and the inside of the grill 28, and the inner edge 72 is spaced from the fascia 26 and the grill 28.

As best shown in FIG. 3, the seal member 66 includes a plurality of protrusions 74 spaced from each other and interleaved with the plurality of supports 52 such that the protrusions 74 and the supports 52 cooperate with each other in an alternating pattern which creates an area configured to absorb energy when the force 14 is applied in the region 50. Therefore, the protrusions 74 and the supports 52 cooperate to create the region 50 which is more pliable than the portion of the body 42 and the seal member 66 outside of that region 50, which will be discussed further below. Generally, absorbing energy can include, as non-limiting examples, deforming, dispersing, bending, flexing, moving, deflecting, dissipating, softening, etc.

Continuing with FIG. 3, the supports 52 and the protrusions 74 cooperate with each other along the region 50. Generally, the supports 52 and the protrusions 74 correspondingly engage. It is to be appreciated that the region 50 with the supports 52 and the protrusions 74 can be larger or smaller than illustrated, and the region 50 can be in other locations than illustrated. The protrusions 74 can project outwardly from the inner edge 72 toward the wall 54. Therefore, the protrusions 74 create a larger area of the seal member 66 along the region 50, thus providing additional energy absorption locations. Furthermore, the supports 52 are disposed between the protrusions 74 to support the protrusions 74. Generally, as best shown in FIG. 3, the protrusions 74 and the supports 52 at least partially overlap.

More specifically, the protrusions 74 can extend outwardly to respective distal ends 76 and the supports 52 can extend outwardly to respective distal ends 78, and the protrusions 74 and the supports 52 can overlap each other between the distal ends 76, 78. Having the protrusions 74 and the supports 52 at least partially overlap provides more surface areas that the supports 52 can support the protrusions 74.

As best shown in FIG. 3, the region 50 of the edge 48 can define a plurality of grooves 80 spaced from each other. More specifically, the lip 56, i.e., the first lip 56, can define the grooves 80 spaced from each other along the region 50 of the edge 48. The supports 52 and the grooves 80 cooperate with each other in an alternating pattern, and in certain embodiments, the supports 52 and the grooves 80 cooperate with each other in an alternating pattern along the lip 56.

Each of the protrusions 74 is disposed in respective grooves 80. In other words, each of the protrusions 74 is disposed in a respective one of the grooves 80. For example, one of the protrusions 74 can be disposed in one of the grooves 80, and so on for the other protrusions 74/grooves 80. By disposing the protrusions 74 in respective grooves 80, the protrusions 74 and the supports 52 overlap each other. The length of the groove 80 can be changed from the Figures, which correspondingly changes the amount of overlap between the protrusions 74 and the supports 52. Furthermore, the protrusions 74, the grooves 80 and the supports 52 can be any suitable configuration, and the Figures are for illustrative purposes only. Additionally, one or more of the protrusions 74 can be a different configuration to each other, some of the protrusions 74 can be the same configuration to each other or all of the protrusions 74 can be the same configuration to each other. Similarly, one or more of the supports 52 can be a different configuration to each other, some of the supports 52 can be the same configuration to each other or all of the supports 52 can be the same configuration to each other. Also similarly, one or more of the grooves 80 can be a different configuration to each other, some of the grooves 80 can be the same configuration to each other or all of the grooves 80 can be the same configuration to each other.

Generally, the protrusions 74 of the seal member 66 can be formed of a material that minimizes the flow of gaseous fluid 32 through the material such that the protrusions 74 direct the flow of gaseous fluid 32 toward the shutter 34. More specifically, the protrusions 74 of the seal member 66 can be formed of the material that directs the flow of gaseous fluid 32 into the pocket 64. In other words, the material that the protrusions 74 are formed of assist in directing the flow of gaseous fluid 32 toward the shutter 34, instead of away from the shutter 34. Furthermore, the material of the seal member 66 can be configured to absorb energy when the force 14 is applied to the region 50. Additionally, the material of the seal member 66 can be configured to absorb noise and/or vibrations.

In certain embodiments, the material of the seal member 66 can be a rubber material configured to direct the flow of gaseous fluid 32 toward the wall 54. More specifically, the rubber material can minimize the flow of gaseous fluid 32 through the seal member 66, which includes the protrusions 74, such that the gaseous fluid 32 is directed toward the shutter 34. Furthermore, the rubber material of the seal member 66 can be configured to absorb energy when the force 14 is applied to the region 50. It is to be appreciated that the seal member 66 can be formed of any suitable material that can minimize the flow of gaseous fluid 32 through the seal member 66, can absorb energy and/or can absorb noise/vibrations.

Furthermore, the body 42 can be formed of a plastic material. The plastic material of the body 42 can be stiffer than the material of the seal member 66. More specifically, the plastic material can be stiffer than the rubber material. As such, the protrusions 74 are softer or more pliable than the supports 52. The body 42 is stiffer than the seal member 66 such that the body 42 and the supports 52 can support the seal member 66 and the protrusions 74.

The region 50 where the supports 52 and the protrusions 74 are located is more pliable than the body 42 and the seal member 66 outside of that region 50 because the body 42 and the seal member 66 are configured differently outside of that region 50. Since the supports 52 are spaced from each other and the protrusions 74 (which are formed of a softer material than the supports 52) are disposed between the supports 52, this allows the supports 52 to move more readily when the force 14 is applied, and thus absorbing energy. As such, when the force 14 is applied to the region 50, energy can be absorbed by, for example, deforming, bending, dispersing, deflecting, moving, etc. (as discussed above), the supports 52 and/or the protrusions 74.

Figure 4:
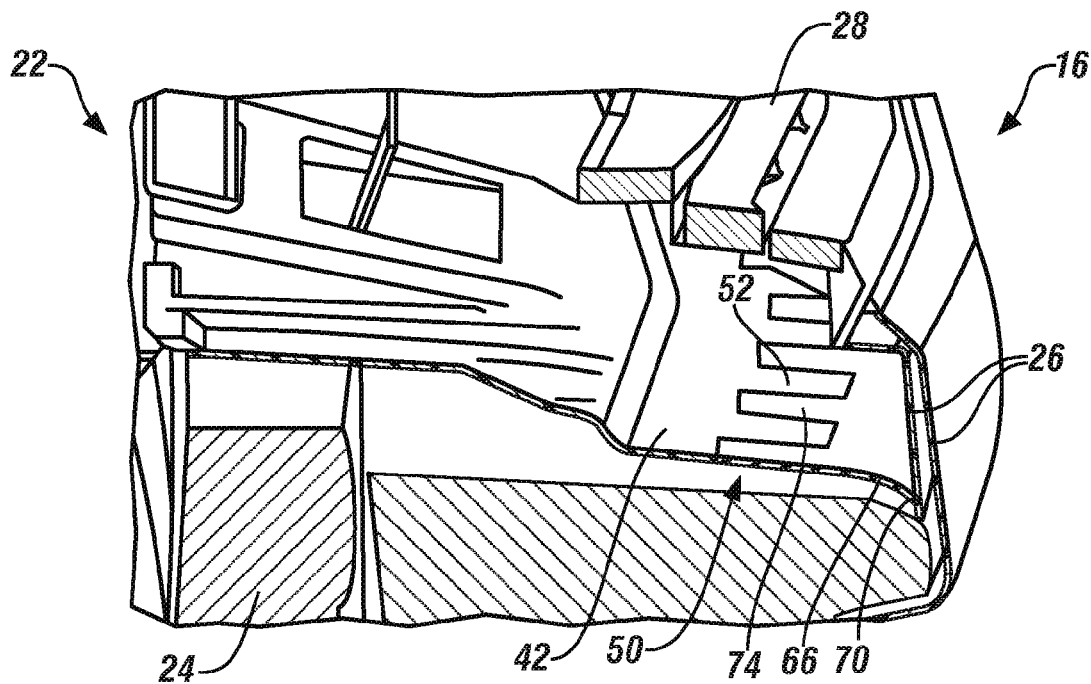
FIG. 4 is a schematic fragmentary cross-sectional view of a fascia and the baffle assembly before a force is applied.
Figure 5:
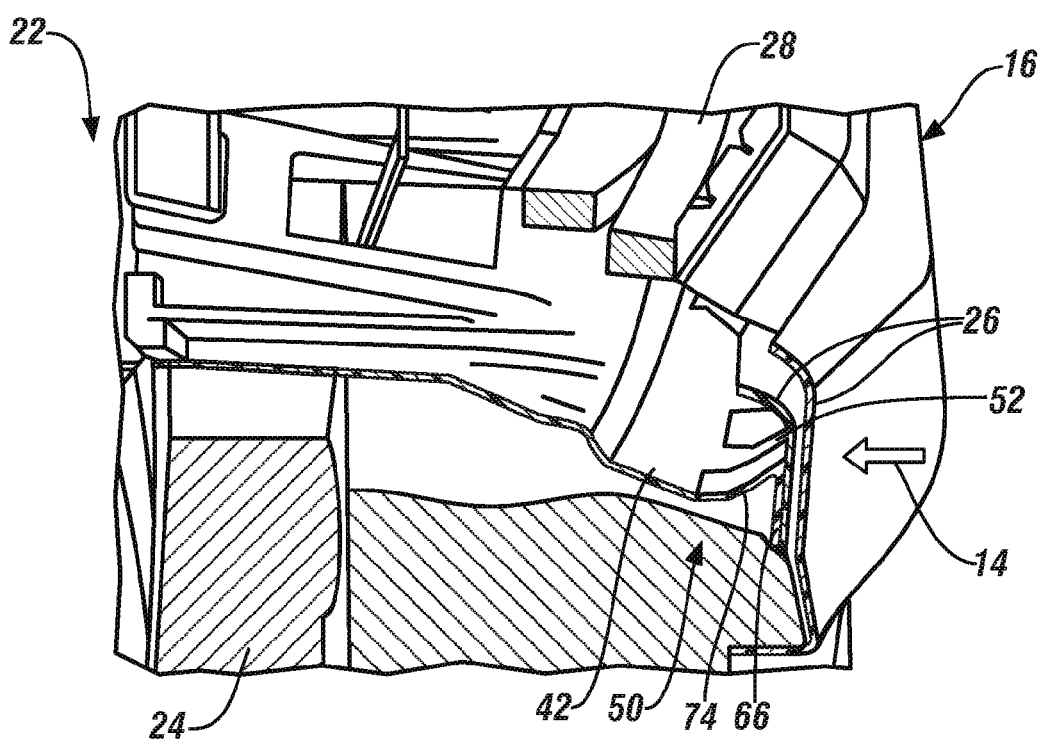
FIG. 5 is a schematic fragmentary cross-sectional view of the fascia and the baffle assembly when the force is applied.

For example, FIG. 4 illustrates the fascia 26, the body 42 and the seal member 66 before the force 14 is applied thereto. FIG. 4 also illustrates a portion of the fascia 26 engaging the inside of the fascia 26. Turning to FIG. 5, this figure illustrates the fascia 26, the body 42 and the seal member 66 when the force 14 is applied. As such, if an object contacts the fascia 26 (which creates the force 14 applied thereto), as shown in FIG. 5, the force 14 can be transferred through the fascia 26 to the seal member 66 and the supports 52 to absorb energy. Simply stated, the leading edge of the first lip 56 is configured to absorb energy when the object applies the force 14 to the fascia 26 which is transferred to the first lip 56.

Figure 6:
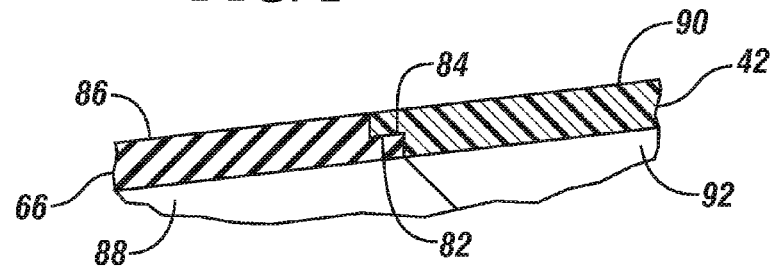
FIG. 6 is a schematic fragmentary cross-sectional view of a body of the baffle assembly and a seal member.

Turning to FIG. 6, the supports 52 can each include a first step 82 along the region 50 of the edge 48, and the protrusions 74 can each include a second step 84 along the region 50 of the edge 48. The first and second steps 82, 84 can increase a surface contact area between the supports 52 and the protrusions 74 when the supports 52 and the protrusions 74 are secured to each other. In certain embodiments, the entire edge 48 of the body 42 and the entire inner edge 72 of the seal member 66 include the first and second steps 82, 84 respectively. FIG. 6 is illustrative of the cross-sectional configuration of the first and second steps 82, 84 along the region 50, the entire edge 48 of the body 42 and entire inner edge 72 of the seal member 66.

The first and second steps 82, 84 increase the surface contact area, which assists in securing together the body 42 and the seal member 66. For example, the body 42 and the seal member 66 can be molded together, bonded together, adhered together, fastened together, etc. One non-limiting example of molding, can include injection molding.

Continuing with FIG. 6, in certain embodiments, the outer surfaces of the protrusions 74 and the supports 52 are substantially flush. Said differently, the thickness of each of the protrusions 74 and the thickness of each of the supports 52 are substantially the same (see FIG. 6). Specifically, the protrusions 74 can include a first outer surface 86 and a second outer surface 88 opposing the first outer surface 86, and the supports 52 can include a third outer surface 90 and a fourth outer surface 92 opposing the third outer surface 90. The first outer surface 86 and the third outer surface 90 can be substantially flush to each other, and the second outer surface 88 and the fourth outer surface 92 can be substantially flush to each other.

It is to be appreciated that the vehicle 10 can include other components, not discussed in detail. For example, the vehicle 10 can include a second shutter 94 (see FIG. 2) disposed below the bumper beam 24. As such, the second shutter 94 is spaced from the shutter 34. The second shutter 94 can also include a plurality of slats 96 arranged to define a plurality of holes 98 to allow gaseous fluid 32 to enter the engine compartment 22. The second shutter 94 is a stationary shutter 34, which is not adjustable to change the amount of the gaseous fluid 32 that can enter the engine compartment 22. Therefore, the second shutter 94 is not an active shutter. When utilizing the second shutter 94, the vehicle 10 can include a second grill 100 (see FIGS. 1 and 2), which generally aligns with the second shutter 94.

Additionally, as another example, the vehicle 10 can include one or more brackets 102 (see FIG. 2) to at least partially support the shutter 34 and the second shutter 94 in a spaced apart relationship. As yet another example, the vehicle 10 can include a condenser, radiator, fan assembly 104 (see FIG. 2) disposed in the engine compartment 22. The condenser, radiator, fan assembly 104 can be disposed behind the bumper beam 24, the shutter 34 and the second shutter 94. In other words, the condenser, radiator, fan assembly 104 can be disposed between the shutters 34, 94 and the passenger compartment 20.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A baffle assembly comprising:
  a body including an edge facing outwardly away from the body, with a region of the edge including a plurality of supports spaced from each other;
  a seal member secured to the edge of the body; and
  wherein the seal member includes a plurality of protrusions spaced from each other and interleaved with the plurality of supports such that the protrusions and the supports cooperate with each other in an alternating pattern which creates an area configured to absorb energy when a force is applied in the region;
  wherein the region of the edge defines a plurality of grooves spaced from each other, with the supports and the grooves cooperating with each other in an alternating pattern, and wherein each of the protrusions is disposed in respective grooves.

2. The assembly as set forth in claim 1 wherein the body defines an aperture and the assembly further including a shutter at least partially disposed in the aperture such that the body surrounds at least part of the shutter, and wherein the region of the edge is disposed below the shutter.

3. The assembly as set forth in claim 2 wherein the protrusions of the seal member are formed of a material that minimizes a flow of gaseous fluid through the material such that the protrusions direct the flow of gaseous fluid toward the shutter.

4. The assembly as set forth in claim 2 wherein the body includes a wall defining the aperture and a lip extending outwardly away from the wall below the shutter, with the lip including the region of the edge and the supports.

5. The assembly as set forth in claim 4 wherein the lip defines the grooves spaced from each other along the region of the edge, with the supports and the grooves cooperating with each other in the alternating pattern along the lip.

6. The assembly as set forth in claim 4 wherein the seal member is formed of a rubber material configured to direct a flow of gaseous fluid toward the wall.

7. The assembly as set forth in claim 4 wherein the seal member includes an outer edge spaced from the edge of the body and an inner edge secured to the edge of the body, with the protrusions projecting outwardly from the inner edge toward the wall.

8. The assembly as set forth in claim 7 wherein the supports each include a first step along the region of the edge, and the protrusions each include a second step along the region of the edge, with the first and second steps increasing a surface contact area between the supports and the protrusions when the supports and the protrusions are secured to each other.

9. The assembly as set forth in claim 1 wherein the body includes a wall and a first lip extending outwardly away from the wall and a second lip extending outwardly away from the wall in the same direction as the first lip such that the lips at least partially overlap each other, with the first and second lips spaced from each other to define a pocket therebetween, with the first lip including the region of the edge and the supports.

10. The assembly as set forth in claim 9 wherein the first lip extends a first distance away from the wall and the second lip extends a second distance away from the wall, with the first distance being greater than the second distance.

11. The assembly as set forth in claim 9 wherein the seal member is secured to the first and second lips, and the protrusions of the seal member are formed of a material that directs a flow of gaseous fluid into the pocket.

12. The assembly as set forth in claim 9 wherein the wall defines an aperture spaced from the first and second lips, and the assembly further including a shutter at least partially disposed in the aperture such that the wall surrounds at least part of the shutter, and wherein the first lip is disposed below the shutter and the second lip is disposed above the shutter.

13. The assembly as set forth in claim 1 wherein the protrusions and the supports at least partially overlap.

14. The assembly as set forth in claim 13 wherein the protrusions include a first outer surface and a second outer surface opposing the first outer surface, and wherein the supports include a third outer surface and a fourth outer surface opposing the third outer surface, with the first outer surface and the third outer surface being substantially flush to each other, and the second outer surface and the fourth outer surface being substantially flush to each other.

15. The assembly as set forth in claim 1 wherein the body is formed of a plastic material and the seal member is formed of a rubber material, with the plastic material being stiffer than the rubber material, and wherein the region where the supports and the protrusions are located is more pliable than the body and the seal member outside of that region.

16. A vehicle comprising:
  a bumper beam;

a baffle assembly disposed above the bumper beam, with the assembly comprising:
a body including an edge facing outwardly away from the body, with a region of the edge including a plurality of supports spaced from each other, and wherein the body defines an aperture;
a seal member secured to the edge of the body; and
wherein the seal member includes a plurality of protrusions spaced from each other and interleaved with the plurality of supports such that the protrusions and the supports cooperate with each other in an alternating pattern which creates an area configured to absorb energy when a force is applied in the region;
a shutter at least partially disposed in the aperture such that the body surrounds at least part of the shutter, and wherein the region of the edge is disposed between the shutter and the bumper beam;
wherein the body includes a wall defining the aperture and a lip extending outwardly away from the wall between the shutter and the bumper beam, with the lip including the region of the edge and the supports;
wherein the lip defines a plurality of grooves spaced from each other along the region of the edge, with the supports and the grooves cooperating with each other in an alternating pattern along the lip, and wherein each of the protrusions is disposed in a respective groove.

17. A baffle assembly comprising:
a body including an edge facing outwardly away from the body, with a region of the edge including a plurality of supports spaced from each other;
a seal member secured to the edge of the body;
wherein the seal member includes a plurality of protrusions spaced from each other and interleaved with the plurality of supports such that the protrusions and the supports cooperate with each other in an alternating pattern which creates an area configured to absorb energy when a force is applied in the region; and
wherein the body includes a wall and a first lip extending outwardly away from the wall and a second lip extending outwardly away from the wall in the same direction as the first lip such that the lips at least partially overlap each other, with the first and second lips spaced from each other to define a pocket therebetween, with the first lip including the region of the edge and the supports.

18. The assembly as set forth in claim 17 wherein the wall defines an aperture spaced from the first and second lips, and the assembly further including a shutter at least partially disposed in the aperture such that the wall surrounds at least part of the shutter, and wherein the first lip is disposed below the shutter and the second lip is disposed above the shutter.

19. The assembly as set forth in claim 17 wherein the first lip defines a plurality of grooves spaced from each other along the region of the edge, with the supports and the grooves cooperating with each other in an alternating pattern along the first lip, and wherein each of the protrusions is disposed in a respective one of the grooves.

20. The assembly as set forth in claim 17 wherein the supports each include a first step along the region of the edge, and the protrusions each include a second step along the region of the edge, with the first and second steps increasing a surface contact area between the supports and the protrusions when the supports and the protrusions are secured to each other.

\* \* \* \* \*